United States Patent [19]

Grace

[11] Patent Number: 5,038,232
[45] Date of Patent: Aug. 6, 1991

[54] SPINDLE MOTOR CONTROL CIRCUIT
[75] Inventor: Alan G. Grace, San Bruno, Calif.
[73] Assignee: Syquest Technology, Fremont, Calif.
[21] Appl. No.: 383,757
[22] Filed: Jul. 19, 1989
[51] Int. Cl.[5] .............................................. G11B 15/46
[52] U.S. Cl. ................................ 360/73.03; 360/73.01
[58] Field of Search ................ 360/73.03, 73.01, 73.03

[56] References Cited
U.S. PATENT DOCUMENTS

| | | | |
|---|---|---|---|
| 4,236,050 | 11/1980 | Winslow et al. | 360/73.03 |
| 4,371,818 | 2/1983 | Lewis | 318/254 |
| 4,774,595 | 9/1988 | Miyake | 360/73.03 |
| 4,815,063 | 3/1989 | Aoshima et al. | 360/73.03 |
| 4,843,288 | 6/1989 | Volz et al. | 318/254 |
| 4,918,544 | 4/1990 | Ishizuka et al. | 360/73.03 |
| 4,928,029 | 5/1990 | Wright | 360/99.08 |

Primary Examiner—A. J. Heinz
Assistant Examiner—Jefferson Evans
Attorney, Agent, or Firm—Fliesler, Dubb, Meyer & Lovejoy

[57] ABSTRACT

A spindle motor control circuit 20 for controlling the acceleration and position locking of a spindle motor 22 includes a first mode of operation whereby the spindle motor 22 is commutated through use of an external clock 32, 34. The control circuit 20 then causes the spindle motor 22 to be self-commutation based on the clock developed from transitions detected by a transition detector 71, which transitions are signals provided from the phase windings of the spindle motor 22. A final mode includes the reading of servo information from the servo sectors on the disc in order to control the final acceleration and position of the spindle motor 22.

20 Claims, 3 Drawing Sheets 5,038,232

SPINDLE MOTOR CONTROL CIRCUIT

FIELD OF THE INVENTION

The present invention is directed to a circuit for controlling the speed of rotation of a disc in a disc drive.

BACKGROUND OF THE INVENTION

There are presently available a number of motor control circuits for controlling the speed of a disc mounted on a spindle motor in a disc drive. One such motor control circuits can be found in European Publication No. 0 251 785, listing Squires et al. as the inventor. This disclosure teaches a process for a achieving and maintaining operating speed for the spindle motor. As part of this process, commutation is accomplished using signals generated from the spindle motor itself.

In some prior art tape drives, motor commutation is accomplished based on signals embedded on the tape itself.

With respect to the above-indicated disc drives and tape drives, there is a positive direct relationship between the media, be it the disc or the tape, and the spindle motor which drives the media.

SUMMARY OF THE INVENTION

The present invention is directed preferably for use with one of the assignees other inventions, namely the use of a magnetic coupling device to couple a memory disc media, and preferably a removable memory disc media housed in a removable cartridge, with a spindle motor fixed in a disc drive (see U.S. Pat. Application Ser. No. 270,948, filed Nov. 14, 1988 and U.S. Pat. Application Ser. No. 270,005, filed Nov. 14, 1988. In such an arrangement, it can be appreciated that due to the magnetic coupling, there is some springiness between the disc and the spindle motor. Thus, readings taken from the spindle motor with respect to the speed of the spindle motor would not necessarily reflect the precise speed of the disc.

Accordingly, the present invention is directed to a circuit for using an transitions embedded about the disc to control the commutation, of the spindle motor (see U.S. Pat. application Ser. No. 07/383,758,entitled "Zone Servo Sector Format Alignment Scheme for Servo and Spindle Motor Control", Inventor: Francis K. King and assigned to the present assignee and filed on the same day hereof, namely July 19, 1989, and incorporated herein by reference).

In an aspect of the present invention, an external clock is used to initiate the commutation of the spindle motor in order to gradually increase the speed of the spindle motor as the clock frequency is increased. Once the speed of the spindle motor has been increased such that voltage of the neutral point of the phase windings reach a reference voltage, commutation is accomplished by a clock signal generated by detecting the back EMF across the phase windings.

In a further aspect of the invention, there is a phase shift incorporated into the signal from the phase windings in order to generate the clocking signal.

In yet a further aspect of the invention, once the heads are loaded onto the disc, a signal embedded in the servo sectors of each track is used to generate a clocking signal which is compared with a reference. This comparison is used to provide a signal for driving the spindle motor in order to increase, maintain or decrease the speed of the spindle motor in order to maintain the proper speed of the disc which is magnetically coupled to the spindle motor.

In yet another aspect of the invention, a spindle motor commutation control for a disc drive having a read/write head and a media disc, which is caused to rotate by the spindle motor and which media disc is provided with a plurality of transitions spaced about the disc, comprises a first means for increasing the speed of the spindle motor until the read/write head is located on the disc, and a second means for using the transitions on the media, as read by the read/write head to continuously control the speed of the spindle motor that causes the disc to rotate and for concurrently disabling the first means.

In another aspect of the invention, the first means includes means for using a signal from the phase windings of the spindle motor and the neutral point to generate a clock signal in order to drive the spindle motor.

In another aspect of the invention, prior in time to the use of the signal from the phase windings, an external clock is used, the frequency of which is increased under computer control, in order to increase the speed of the spindle motor. Once the spindle motor has attained a desired speed such that the voltage from the neutral point of the spindle motor windings reaches a predefined reference value, the circuit shifts to providing commutation based upon the above signal from the phase windings of the spindle motor.

Thus it is an object of the present invention to provide for spindle motor commutation by using signal embedded in servo sectors spaced along each track of a disc in order to generate a clock signal which controls the speed of the spindle motor and thus stabilizes the speed of the disc. Such an arrangement is highly advantageous for use when the disc is, for example, magnetically coupled to the spindle motor, as opposed to the industry standard of having the disc physically engaging the spindle motor.

DETAILED DESCRIPTION OF THE PREFERRED EMBODIMENT

Figure 1:
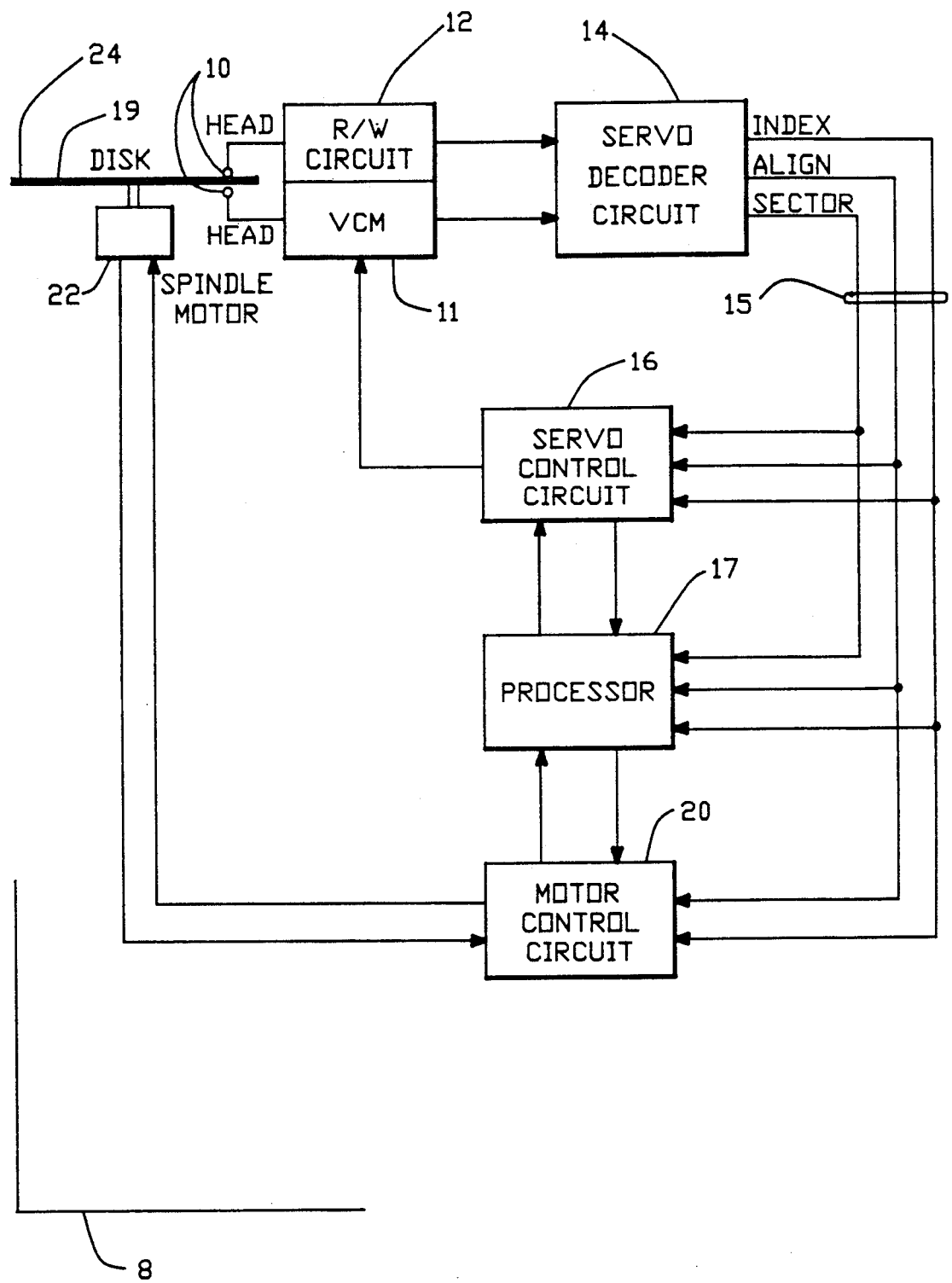
FIG. 1 depicts a block diagram of a servo motor and a spindle motor control circuits for a disc drive using the present invention.

With respect of FIG. 1, a disc drive 8 which either permanently or removably receives a disc 19 is depicted. The disc drive 8 includes heads 10 which are mounted to an actuator such as voice coil motor (VCM) 11 and associated with read/write circuit 12 for reading and/or writing information at a desired locations on a disc 24, as accessed by the movement of the heads 10 by the voice coil motor 11. The disc 24 is provided in rotation by the spindle motor 22. Servo information or indicia 19 recorded on the disc 24 in servo sectors 19 is provided through the read/write circuit 12 to servo decoder circuit 14. The output of which servo decoder circuit 14 is provided over lines 15 as appropriate to the servo control circuit 16 for the voice coil motor 11, and to the spindle motor commutation circuit 20 for the spindle motor 13 and the microprocessor 17, which controls the controls circuits 16, 18. The information on the servo sectors, embedded on the disc, is read, interpreted and used to determine and lock in the speed of the spindle motor in order to stabilize the speed of the disc.

Figure 2:
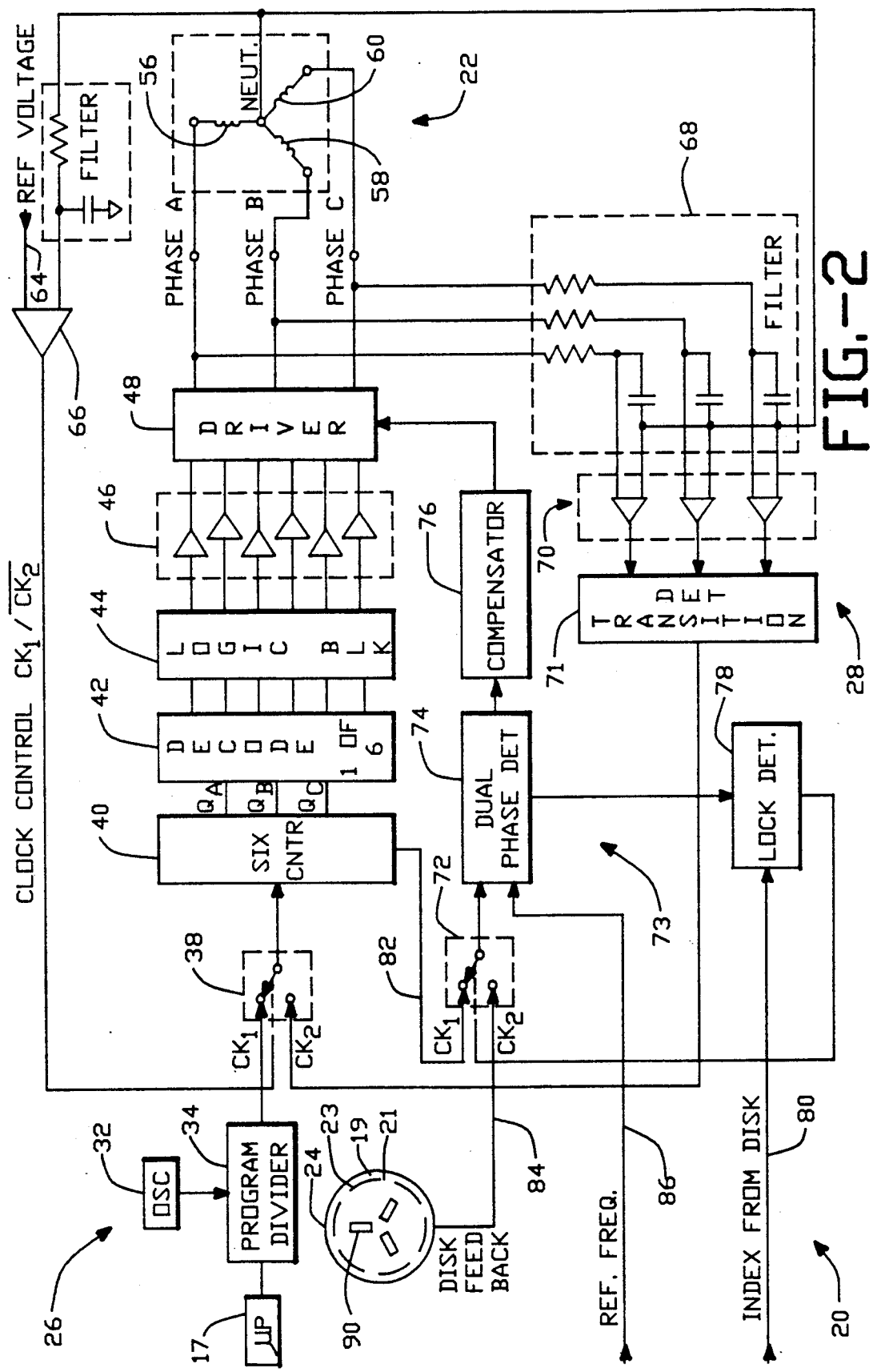
FIG. 2 depicts a schematic of a spindle motor commutation circuit of the invention.

With reference to FIG. 2 the spindle motor commutation control circuit 20 is depicted in greater detail. This control circuit 20 controls the speed of the spindle motor 22 in order to ensure that the disc 24 is maintained at the appropriate rotational speed.

Initially the rotational speed is determined by an external clock 26 until the voltage across the neutral point of the phase windings of the spindle motor 22 reach a reference value. When this occurs, an internal clock 28 takes over control of increasing the speed of the spindle motor. The internal clock 28 is composed of signals generated by the back EMF across the phase windings coils of the spindle motor 22. After the read/write heads have been loaded onto the disc 24, a third and final clock is developed based on transition signals embedded in the servo sectors 19 which are spaced about each track 23 of the disc 24.

In FIG. 2, the external clock 26 is established by oscillator 32, the signal of which is divided by program divider 34 under the control of a microprocessor 17. Initially the frequency output (Clock1) from the program divider 34, is based on the dynamics of the system. Generally, the frequency is chosen so that it is low enough that commutation can be started in the desired direction, but the frequency is high enough such that the second commutation will occur before any substantial acceleration in a reverse direction occurs. At this point, there is no provision made to optimize the torque as all that is required is rotating torque to start the spindle motor 22.

Under control of the microprocessor 17, the divider 34 will lower the divider ratio so that the frequency of Clock 1 will increase which will cause a gradual acceleration and gradual increase in the rotational velocity of the spindle motor 22. The Clock 1 signal is provided through switch 38 to a one of six counter 40 and therefrom to a one of six decoder 42 and logic block 44. Logic block 44 defines as desired a clockwise or a counter-clockwise sequence of all commutation for the spindle motor 22.

It is to be understood that in this preferred embodiment, commutation is clockwise and the spindle motor 22 comprises a three-phase spindle motor. It is to be further understood that commutation in other embodiments may be other than clockwise and that the spindle motor may have more or less than three-phases with necessary modifications to the counter, decoder and phase delay for each embodiment.

The signal from logic block 44 is provided through buffers 46 to driver arrangement 48.

Figure 3:
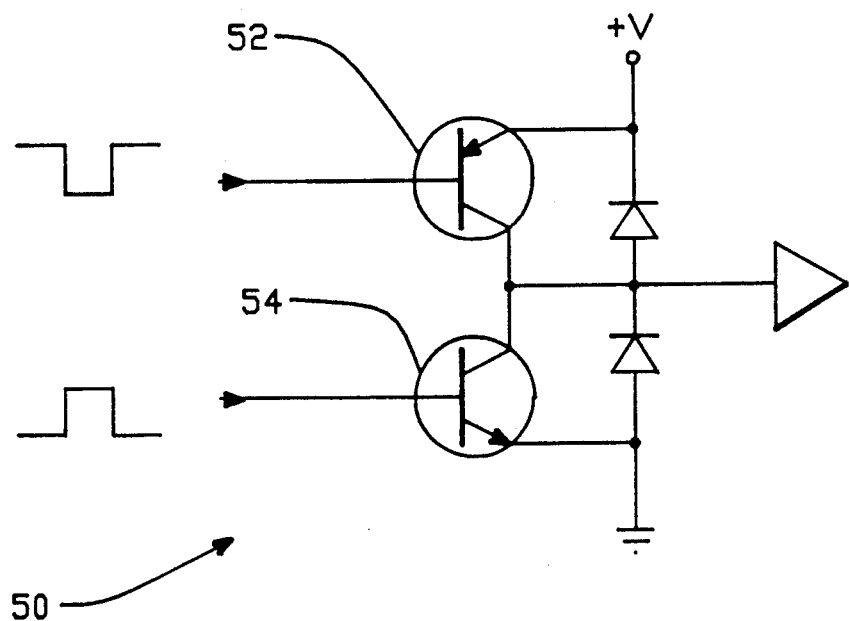
FIG. 3 depicts a schematic of a driver circuit for use in the circuit of FIG. 2.

In a preferred embodiment, driver arrangement 48 is comprised of complementary drivers 50, which has transistors 52, 54 as shown in FIG. 3. These complementary drivers can be either PNP and NPN, upper and lower transistor pairs or P and N channel MOSFET pairs. The power (+V), from compensator 76 is connected to the PNP emitter and ground is connected to the NPN emitter in FIG. 3. Both collectors are connected together and output to the motor phase winding. The bases of both transistors receive the pulse signal from the buffer 46. It is to be noted that transistor 52 and 54 are not on at the same time.

The output from the driver arrangement 48 is provided to the phase or stator windings 56, 58 and 60 of the spindle motor 22. Under the control of the microprocessor 36, the speed of the spindle motor 22 is increased until the voltage at the neutral point 62 of the phase windings exceeds a reference voltage 64 as determined by comparator 66. When this occurs, the switch 38 is actuated to allow a new clocking signal, Clock 2, to be sent to the one of six counter 40 in order to provide a commutation signal for the spindle motor 22.

Figure 4:
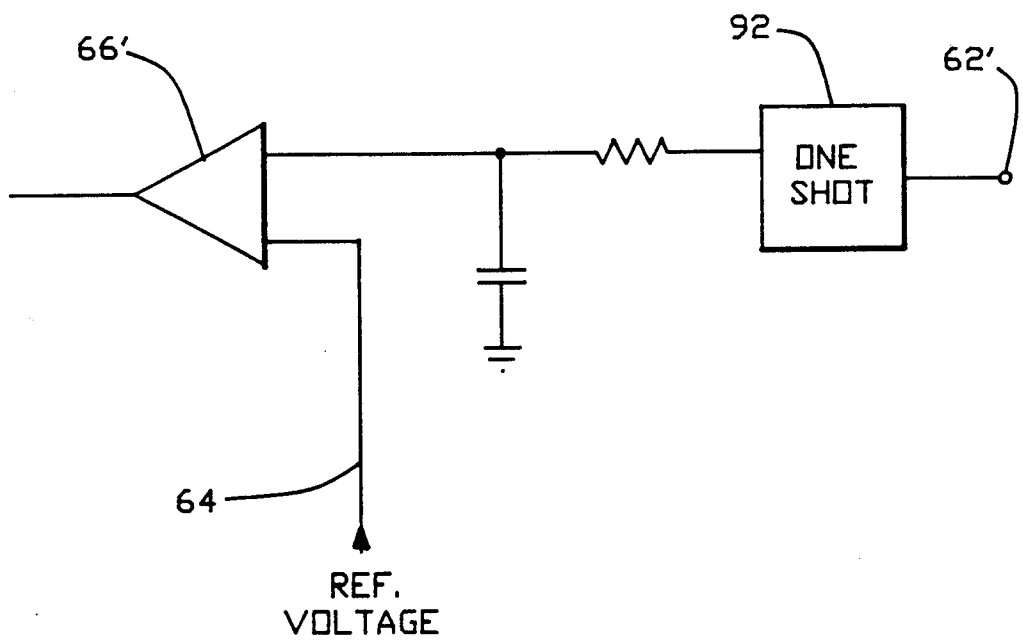
FIG. 4 depicts an alternative embodiment of an aspect of the invention.

In an alternate embodiment a one shot multivibrator 92 is included as shown in FIG. 4 between the neutral point 62' of the phase windings and the comparator 66'. This arrangement gives a more exact change over signal to the switch 38 to allow the Clock 2 to be used by spindle motor commutation control circuit 20.

The signal of Clock 2 is derived from the phases A, B and C of the phase windings 56, 58 and 60 of the spindle motor 22. The back EMF from these phases as well as the signal from the neutral point 62 is provided to filter arrangement 68 which provides for a phase lag, at commutation frequencies. In the preferred embodiment, the phase lag created by filter arrangement 68 is approximately 30° of electrical phase shift at the normal running frequency of the motor. Filter arrangement 68 communicates with three comparators 70 which compare the signals provided from the three phases and the neutral point. The signals from the comparator 70 are then provided to a transition detector 71 which produce a signal of 18 pulses per revolution of the spindle motor. Six edges per commutation cycle, are achieved as the present six embodiment contemplates the use of a three-phase, six pole motor. There will be three separate commutations cycles per revolution, as the number of commutation cycles depending on the number of poles of the motor. Thus, in this embodiment, the six edges per commutation cycle produce 18 pulses per revolution of the motor.

This above signal now becomes the Clock 2 which is input at switch 38. Accordingly, at this time, the motor is self-commutating. For a motor speed of 3500 rpm, the commutation frequency, given three commutation cycles per phase is 175 Hz. As the commutation frequency is 175 Hz, the signal from the transition detector 71 is 175 Hz times six pulses per - electrical commutation cycles which is equal to 1050 Hz optimally.

The final and remaining acceleration cycle and final position lock is controlled by the torque loop 73 which is comprised of switch 72, dual phase detector or comparator 74, compensator 76, and lock detector 78. Generally, compensator 76 modulates the level of the voltage output from the driver 48 and hence controls motor torque and final motor position. Switch 72 selects the signal source for the dual phase comparator 74. Initially the signal source is from the one of six counter 40. With feedback from the one of six counter 40, the dual phase comparator 74 and compensator 76 accelerate the motor 22 until reference frequency is achieved. In the present embodiment, the reference frequency is 1050 Hz which is as calculated above. It can be appreciated that the referenced frequency is provided by an oscillator appropriately divided to the required frequency.

When the heads 10 are loaded onto the disc 24 and the index pulse 21 can be read off the disc over line 80, the feedback source from switch 72 is switched from the line 82, from the one of six counter 40, to line 84, which brings a signal read from the servo information on the servo sectors 19 on the disc 24.

In a preferred embodiment, when four consecutive index pulses 21 are provided to the lock detector 78, the lock detector 78 causes switch 72 to quit reading the information on line 84 and thereby begins processing data from the surface of the disc 24 itself (third mode of operation).

It is to be understood that the compensator 76 operates through all modes of operation of this invention to apply the proper voltage to drive 48 and thus accelerate the spindle motor 22 through all of said modes of operation.

In an alternative embodiment the spindle motor can be comprised of stator windings such as stator windings 56, 58 and 60 with the permanent magnets 90 of the rotor of the spindle motor integral with the disc 24 in FIG. 2. Such an arrangement is of particular benefit when the disc 24 and magnets 90 are housed in a removable cartridge which can be selectably inserted into a disc drive and removal for safe storage. Such an arrangement is more economical as it saves a component part (i.e., a separate spindle motor rotor). Further, such an arrangement does not experience the springiness which can occur when a disc in a cartridge is magnetically coupled to a spindle motor which spindle motor has its own rotor and stator windings.

Industrial Applicability

The operation of the control circuit 22 of the invention is as follows. Initially, in the first mode of operation, using an external clock, Clock 1 the frequency of which is continually increased under computer control, initial torque by the torque loop 73 is applied to drive the spindle motor 22 by placing voltage signals across the phase windings of the spindle motor 22. After the neutral point of the spindle motor 22 reaches a reference voltage, the motor becomes self-commutating as a transition detector 71 detects transitions and uses these detections to generate a second clock, Clock 2 based on signals read from each of the phase windings. Finally, after the heads have been loaded onto the disc, the circuit 20 enters the third mode by reading servo information from the servo sectors on the disc in order to commutate the motor.

From the above it can be seen that with Assignee's latest invention of using a magnetic clutch between the disc and the spindle motor as described in the above referenced U.S. patent applications, that by reading information from the disc as opposed to from the spindle motor and by being able to sample information about the disc, the position of the disc can be accurately locked by the circuit 20 controlling the spindle motor 22.

Other aspects and objects of the invention can be observed from a review of the claims and figures.

It is to be understood that other embodiments of the present invention be developed which would fall within the spirit and scope of the claims.

What is claimed is:

1. A spindle motor commutation control for a disc drive using a read/write head and a disc which is caused to rotate by the spindle motor, which disc is provided with a plurality of transitions spaced about the drive comprising:
   first means for increasing the speed of the spindle motor until at least the read/write head is located onto the disc, wherein said first means includes:
   (a) means for providing an external clock;
   (b) means for increasing the frequency of the external clock in order to drive the spindle motor;
   (c) means for comparing the voltage of a neutral point of the spindle motor with a reference voltage as the frequency of the external clock is increased; and
   (d) means for using the feedback signal from phase windings of the spindle motor and the neutral point to generate another signal in order to drive the spindle motor when the voltage from the neutral point has a predefined relationship with the reference voltage; and
   second means for using the transitions on the disc, as read by the read/write head, to continuously control the speed of the spindle motor which causes the disc to rotate and for disabling the first means.

2. The control of claim 1 wherein the means for using the feedback from the phase windings includes:
   means for shifting the phase of the feedback signal for each of the phase windings depending on the characteristics of the spindle motor.

3. The control of claim 1 wherein the second means includes:
   means for providing a reference frequency;
   means for comparing the reference frequency with a signal generated using the transitions on the disc;
   means for using the results of the comparing means for compensating a driving signal provided to the spindle motor.

4. The control of claim 1 wherein the second means includes:
   means for comparing the signal generated using the transitions on the disc to a reference signal and for driving the spindle motor dependant on the results of the comparison.

5. The control of claim 1 further including:
   means for providing a reference frequency;
   means for comparing the reference frequency selectively with either (1) a signal derived from the signal from the first means or (2) a signal from the second means; and
   means for using results of the comparing means for compensating a driving signal provided to the spindle motor.

6. The control of claim 1 wherein the spindle motor has phase windings and a neutral point and wherein the first feedback signal using includes:
   means for generating phase shifted signals from signals taken from each phase winding of the spindle motor;
   means for combining the phase shifted signals with signals from the neutral point of the spindle motor for generating a combined signal; and
   means for detecting changes in the combined signal in order to generate a clock signal for providing for self-commutating of the spindle motor.

7. The control of claim 1 wherein:
   said second means disables the first means when a preselected number of transitions are read from the disc by the read/write head.

8. The control of claim 1 wherein the spindle motor has at least one rotor magnet integral with the media disc.

9. A spindle motor commutation control for a disc drive having a read/write head and a disc, which is caused to rotate by a spindle motor, which disc is provided with a plurality of transitions spaced about the disc, comprising:

first means for increasing the speed of the spindle motor independent of signals from the disc and signals from the spindle motor;

second means for controlling the speed of the spindle motor based on signals from the spindle motor;

third means for switching from the first means to the second means;

fourth means for continuously controlling the speed of the spindle motor based on signals generated when the read/write head reads the transitions on the disc; and fifth means for switching from the second means to the fourth means.

10. The control of claim 10 wherein:

said first means includes:
 (a) means for providing an external clock;
 (b) means for increasing the frequency of the external clock in order to increase the speed of the spindle motor;

wherein said third means includes:
 (a) means for comparing the voltage of a neutral point of the spindle motor with a reference voltage as the frequency of the external clock is increased;

wherein said second means includes:
 (a) means for using the feedback signal for phase windings of the spindle motor and the neutral point to generate a clock signal in order to drive the spindle motor when the voltage from the neutral point has a predefined relationship with the reference voltage.

11. The control of claim 10 wherein the means for using the feedback from the phase windings include:

means for shifting the phase of the feedback signal for each of the phase windings depending on the characteristics of the spindle motor.

12. The control of claim 10 wherein the third means includes one shot multivibrator interposed between the neutral point and the means for comparing the voltage of the neutral point and a reference voltage.

13. The control of claim 9 wherein said fourth means includes:

means for providing a reference frequency;

means for comparing the reference frequency with the signal generated using the transitions on the disc; and means for using the results of the comparing means for compensating a driving signal provided to the spindle motor.

14. The control of claim 9 wherein said fourth means includes:

means for comparing a signal generated using the transitions on the disc to a reference signal and for driving the spindle motor dependant on the results of the comparison.

15. The control of claim 9 further including:

means for providing a reference frequency;

means for comparing the reference frequency selectively with either (1) a signal derived from the signal from the second means or (2) a signal from the fourth means; and means for using results of the comparing means for compensating a driving signal provided to the spindle motor.

16. The control of claim 9 wherein the spindle motor has phase windings and a neutral point and wherein the second means includes:

means for generating phase shifted signals from signals taken from each phase winding of the spindle motor;

means for combining the phase shifted signal with signals from the neutral point of the spindle motor for generating a combined signal; and means for detecting changes in the combined signal in order to generate a clock signal for providing for self-commutating of the spindle motor.

17. The control of claim 9 wherein the spindle motor has at least one rotor magnet integral with the media disc.

18. The control of claim 9 wherein said third means includes a one shot multivibrator.

19. A spindle motor commutation control for a disc drive having a read/write head and a disc which is caused to rotate by a spindle motor, which disc is provided with a plurality of transitions spaced about the disc comprising:

first means for increasing the speed of the spindle motor, based on a pre-established scheme, from substantially zero rotational velocity until a pre-established condition exists with respect to the spindle motor, said first means operating independent of signals from the disc and signals from the spindle motor;

second means for causing the spindle motor to become self-commutating due to signals from the spindle motor after the pre-established condition exists with respect to the spindle motor; and third means for substantially simultaneously using the transitions for the disc to commutate the spindle motor and for disabling the second means after the read/write head has been loaded on the disc.

20. The control of claim 17 wherein the spindle motor has at least one rotor magnet integral with the media disc.

* * * * *